US011323905B2

(12) United States Patent
Müller

(10) Patent No.: US 11,323,905 B2
(45) Date of Patent: May 3, 2022

(54) WIRELESS DEVICE, HIGHER LAYER NODE AND METHODS FOR HANDLING MEASUREMENT REPORTING IN A WIRELESS NETWORK

(71) Applicant: Telefonaktiebolaget LM Ericsson (publ), Stockholm (SE)

(72) Inventor: Walter Müller, Upplands Väsby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 71 days.

(21) Appl. No.: 16/612,718

(22) PCT Filed: May 12, 2017

(86) PCT No.: PCT/EP2017/061446
§ 371 (c)(1),
(2) Date: Nov. 11, 2019

(87) PCT Pub. No.: WO2018/206117
PCT Pub. Date: Nov. 15, 2018

(65) Prior Publication Data
US 2020/0169904 A1    May 28, 2020

(51) Int. Cl.
*H04W 24/10* (2009.01)
*H04W 76/27* (2018.01)
*H04W 36/00* (2009.01)
*H04W 36/30* (2009.01)
*H04W 48/16* (2009.01)

(52) U.S. Cl.
CPC ....... *H04W 24/10* (2013.01); *H04W 36/0088* (2013.01); *H04W 36/30* (2013.01); *H04W 48/16* (2013.01); *H04W 76/27* (2018.02)

(58) Field of Classification Search
CPC ..................................................... H04L 12/28
USPC ............................................................ 370/400
See application file for complete search history.

(56) References Cited

U.S. PATENT DOCUMENTS

2016/0020848 A1*   1/2016   Leonard ............... H04B 10/118
370/316

FOREIGN PATENT DOCUMENTS

WO     2016080875 A1    5/2016

OTHER PUBLICATIONS

Unknown, Author, 3GPP TSG-RAN WG2 #98, R2-1704865, Hangzhou, China, May 15-19, 2017, pp. 1-3.
(Continued)

*Primary Examiner* — Dang T Ton
(74) *Attorney, Agent, or Firm* — Murphy, Bilak & Homiller, PLLC

(57) ABSTRACT

A wireless device (400), a higher layer node (404) and methods therein, for handling measurement reporting in a wireless network as performed by the wireless device (400). The wireless device (400) detects (4:1) a coverage object being a cell or a beam not contained in a predefined first list of coverage objects for which the wireless device (400) is required to send measurement reports to a lower layer node (402) operable according to at least one of layer 1 and layer 2. The wireless device (400) then measures a radio signal of the coverage object where the measured radio signal fulfils a predefined event condition, and sends (4:2B) a measurement report of said measuring to a higher layer node (404) operable according to one or more layers above layer 1 and layer 2.

27 Claims, 6 Drawing Sheets

(56) References Cited

OTHER PUBLICATIONS

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.2.0, Mar. 2017, pp. 1-330.
Unknown, Author, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.4.0, Dec. 2016, pp. 1-629.
Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, pp. 1-721.
Unknown, Author, "Overview of Mobility enhancement for NR", 3GPP TSG-RAN WG2#98, R2-1704852, Hangzhou, China, May 15-19, 2017, pp. 1-6.

\* cited by examiner

WIRELESS DEVICE, HIGHER LAYER NODE AND METHODS FOR HANDLING MEASUREMENT REPORTING IN A WIRELESS NETWORK

TECHNICAL FIELD

The present disclosure relates generally to a wireless device, a higher layer node and methods therein, for handling measurement reporting in a wireless network as performed by the wireless device.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which could be used herein as a synonym for wireless device.

Further, the terms "higher layer node" and "lower layer node" are used herein to distinguish between nodes of a wireless network depending on which layer(s) they are operable to use. In the field of telecommunication, the protocol and communication layers of an Open Systems Interconnection OSI model are well-known and generally referred to as "layers" for short. Thus, layer 1 and layer 2 are generally referred to as lower layers, while any layers higher than layers 1 and 2 are generally referred to as higher layers, according to customary terminology in this field. The original version of the OSI model defined seven layers where layer 1 is a physical layer and layer 2 is a data link layer. The highest layer such as layer 7 is generally referred to as the application layer and the layers below are used to serve the application layer by conveying data and information related to some kind of application.

The higher layer node in this disclosure may refer to a logical combination of a core network node and a Radio Access Network Controlling node, or a "central unit" which could be part of a logical node denoted "gNB" as defined by 3GPP for Next Generation, NG, radio networks which also defines lower layer nodes as "distributed units" which could likewise be part of a logical node gNB. The wireless network may further comprise a radio network part and a core network part and the terms "radio network" and "core network" are customarily used in this field. In conventional procedures employed in wireless networks, a wireless device is required to perform measurements of radio signals and to report the measurements to a higher layer node, typically using a protocol called Radio Resource Control, RRC, if the measured radio signal fulfils a predefined event condition. The higher layer node may, among other things, be capable of terminating an RRC protocol layer and to transmit and receive RRC messages, and the measurement reports may be referred to as RRC measurement reports.

The lower layer node(s) in this disclosure basically belongs to a radio part of the network and may be operative to communicate radio signals with wireless devices, using a physical and MAC layer protocol. The lower layer node(s) may also be capable of terminating the RRC protocol layer and transmit and receive some selected RRC layer protocol messages. Depending on the terminology used, the lower layer node may be called a distributed unit, base station, radio node, Node B, base transceiver station, access point, etc., although this disclosure is not limited to these examples. The lower layer node may also be a node in the wireless network, such as a Radio Network Controller, RNC, that controls one or more base stations or radio nodes that communicate radio signals with wireless devices.

FIG. 1 illustrates an example of how a higher layer node 100 and a number of lower layer nodes 102 may be arranged in a typical wireless network. The lower layer nodes 102 provide radio coverage in the form of cells and/or beams 104 for wireless devices, which is well-known in this field. This example illustrates that a wireless device 106 receives and measures various radio signals transmitted in the cells and/or beams 104.

FIG. 1A further illustrates how a lower layer node 102 may be arranged to communicate signals over a set of transmission and reception, Tx/Rx, points 102A each providing radio coverage in a cell or beam. For example, a lower layer node may perform radio communication over a single Tx/Rx point, or over multiple spatially separated Tx/Rx points as shown in FIG. 1A. Using the terminology of 3GPP NG, the higher layer node 100 may be referred to as a central unit and the lower layer nodes 102 may be referred to as distributed units. A distributed unit may be connected to one or several central units.

If a measured radio signal fulfils a predefined event condition as defined for Long Term Evolution, LTE, the device 106 is required to report the measurement to the higher layer node 100 over the RRC protocol, as illustrated schematically by a dashed arrow to the higher layer node 100. Thereby, the higher layer node 100 can evaluate the measurements, e.g. in view of preparing a handover for the device, by having control of the lower layer nodes 102 and their cells and/or beams 104.

The event conditions defined for LTE in TS 36.331 v13.4.0 today are as follows:
  Event A1 (Serving becomes better than threshold)
  Event A2 (Serving becomes worse than threshold)
  Event A3 (Neighbour becomes offset better than PCell/PSCell)
  Event A4 (Neighbour becomes better than threshold)
  Event A5 (PCell/PSCell becomes worse than threshold1 and neighbour becomes better than threshold2)
  Event A6 (Neighbour becomes offset better than SCell)
  Event B1 (Inter RAT neighbour becomes better than threshold)
  Event B2 (PCell becomes worse than threshold1 and inter RAT neighbour becomes better than threshold2)
  Event C1 (CSI-RS resource becomes better than threshold)
  Event C2 (CSI-RS resource becomes offset better than reference CSI-RS resource)
  Event W1 (WLAN becomes better than a threshold)
  Event W2 (All WLAN inside WLAN mobility set becomes worse than threshold1 and a WLAN outside WLAN mobility set becomes better than threshold2)
  Event W3 (All WLAN inside WLAN mobility set becomes worse than a threshold)

These events are defined and further described in the 3GPP document TS 36.331 v13.4.0. Once a measured radio signal fulfills any of these predefined event conditions, the device 106 is thus required to report the measurement to the higher layer node 100 over the RRC protocol. The above example event conditions may also be referred to as measurement reporting rules or the like. If a signal measurement does not fulfill entering or leaving criteria of any of those event conditions the wireless device 106 will not report the measurement.

However, it may be a problem that the measurement reporting is sometimes delayed before reaching the higher layer node 100, given the long transport chain from the wireless device 104 to the higher layer node 100. As a result, potentially important decisions regarding the wireless device 104 such as handover decisions may be taken on measurements that have become "out-of-date" and thus irrelevant and misleading due to rapidly changing radio conditions. Another drawback is that many measurement reports are not really needed by the higher layer node 100 to achieve adequate control of the radio communication, and such reports are therefore effectively wasted and add unnecessary load on the network. Such measurement reporting is thus typically used as a basis for handover preparation and execution procedure which will also be delayed by the transport chain from the wireless device 104 to the higher layer node 100 and between the higher layer and lower layer node.

SUMMARY

It is an object of embodiments described herein to address at least some of the problems and issues outlined above. It is possible to achieve this object and others by using wireless device, a higher layer node and methods therein as defined in the attached independent claims.

According to one aspect, a method is performed by a wireless device for handling measurement reporting in a wireless network. In this method, the wireless device detects a coverage object being a cell or a beam not contained in a predefined first list of coverage objects for which the wireless device is required to send measurement reports to a lower layer node in the wireless network operable according to at least one of layer 1 and layer 2. The wireless device then measures a radio signal of the coverage object where the measured radio signal fulfils a predefined event condition, and sends a measurement report of said measuring to a higher layer node in the wireless network operable according to one or more layers above layer 1 and layer 2.

According to another aspect, a wireless device is arranged to handle measurement reporting in a wireless network. The wireless device is configured to detect a coverage object being a cell or a beam not contained in a predefined first list of coverage objects for which the wireless device is required to send measurement reports to a lower layer node in the wireless network operable according to at least one of layer 1 and layer 2. The wireless device is further configured to measure a radio signal of the coverage object where the measured radio signal fulfils a predefined event condition, and to send a measurement report of said measuring to a higher layer node in the wireless network operable according to one or more layers above layer 1 and layer 2.

According to another aspect, a method is performed by a higher layer node of a wireless network for handling measurement reporting by a wireless device, the higher layer node being operable according to one or more layers above layer 1 and layer 2. In this method, the higher layer node receives from the wireless device a measurement report for a measured radio signal of a coverage object. The received measurement report indicates that the measured radio signal fulfils a predefined event condition, the coverage object being a cell or a beam not contained in a predefined first list of coverage objects for which the wireless device is required to send measurement reports to a lower layer node in the wireless network operable according to at least one of layer 1 and layer 2. The higher layer node then obtains a second list of coverage objects containing the reported coverage object, and sends the second list to the wireless device as an instruction to apply the second list for measurement reporting to the lower layer node.

According to another aspect, a higher layer node is arranged to handle measurement reporting by a wireless device in a wireless network, the higher layer node being operable according to one or more layers above layer 1 and layer 2. The higher layer node is configured to receive from the wireless device a measurement report for a measured radio signal of a coverage object. Said measurement report indicates that the measured radio signal fulfils a predefined event condition, the coverage object being a cell or a beam not contained in a predefined first list of coverage objects for which the wireless device is required to send measurement reports to a lower layer node in the wireless network operable according to at least one of layer 1 and layer 2.

The higher layer node is also configured to obtain a second list of coverage objects containing the reported coverage object, and to send the second list to the wireless device as an instruction to apply the second list for measurement reporting to the lower layer node.

The above wireless device, higher layer node and methods therein may be configured and implemented according to different optional embodiments to accomplish further features and benefits, to be described below.

A computer program is also provided which comprises instructions which, when executed on at least one processor, cause the at least one processor to carry out either of the methods described above. A carrier containing the above computer program is further provided, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
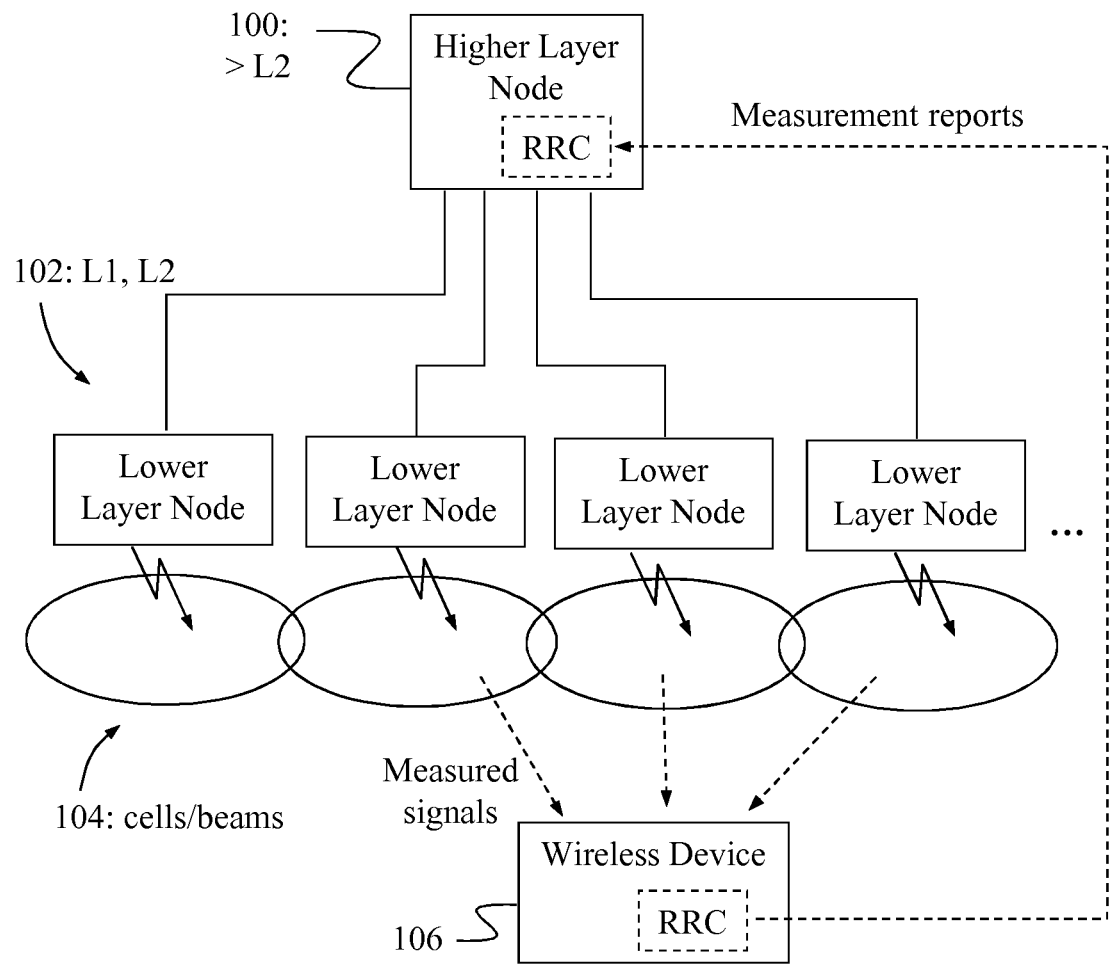
FIG. 1 is a communication scenario illustrating how a higher layer node and a number of lower layer nodes may be arranged, according to the prior art.

Briefly described, a solution is provided to enable more efficient and useful signaling of measurement reports from a wireless device to a higher layer node associated with a wireless network and/or to a lower layer node of the wireless network. This can be accomplished by configuring the wireless device with a predefined list of coverage objects, where a coverage object is defined as being a cell or a beam in which radio coverage is provided. Throughout this disclosure, the term "coverage object" could thus be replaced by the term "cell or beam". It is assumed that the wireless device is served by a lower layer node, such as a base station or other transmission/reception point of the wireless network.

In this solution, the wireless device is required to send reports of measured radio signals of coverage objects contained in the list to its serving lower layer node, instead of to a higher layer node as required in conventional procedures as described above. Hence, if a measured radio signal fulfils a predefined event condition and comes from a coverage object that is actually in the list, the wireless device accordingly sends a report of the measured radio signal to the lower layer node since the measurement can be evaluated, e.g. in view of a potential handover, by the lower layer node having control of coverage objects included in the list.

Thereby, the measurement report will reach the lower layer node much faster than it would reach a higher layer node as in conventional procedures, and the lower layer node can evaluate and use the measurement before it might become out-of-date, i.e. invalid or even misleading, e.g. for handover decision, preparation and execution, or for estimation of interference, and so forth. A prerequisite for reporting to the lower layer node is thus that the coverage object of the measured signal must be in the list of coverage objects being configured in the wireless device. It should be noted that lower layer signaling between lower layer nodes, e.g. using an X2 interface, is generally much faster than higher layer signaling which is similar to using, e.g., an S1 interface.

On the other hand, the wireless device in this solution sends the report to the higher layer node only if the radio signal comes from a coverage object that is not in the list. Thereby, the measurement can be evaluated by the higher layer node, e.g. in view of a potential handover, since the higher layer node has control of a much larger area of coverage objects than just those in the list. Thereby, the higher layer node has also the possibility to configure the wireless device with another list of coverage objects which list contains the reported coverage object such that the wireless device would be required to apply the new list for measurement reporting to a lower layer node. The higher layer node is thus able to actually control the wireless device's measurement reporting by configure the device with a suitable list of coverage objects.

The higher layer node may also take a handover decision, do preparation and execution of the handover between coverage objects belonging to different lower layer nodes. The higher layer node may further take actions for estimation of interference between different lower layer node coverage objects. The higher layer node may further do preparation and execution of handover to another higher layer node.

An example will now be described, with reference to the flow chart in FIG. 2, of how the solution may be employed in terms of actions which could be performed by a wireless device. Some optional example embodiments that could be used in this procedure will also be described below. This procedure may be employed in a wireless network which may be of any type and any suitable protocols and standards for communication may be employed in this network.

The wireless device in this procedure is arranged to handle measurement reporting in a wireless network. A first action 200 illustrates that the wireless device detects a coverage object being a cell or a beam not contained in a predefined first list of coverage objects for which the wireless device is required to send measurement reports to a lower layer node in the wireless network operable according to at least one of layer 1 and layer 2.

For example, the coverage object may be detected and identified by receiving and reading broadcasted information which is transmitted from a Tx/Rx point serving the coverage object, where the broadcasted information includes an identification of the coverage object. The coverage object may also be detected and identified by receiving and reading a cell or beam specific reference signal transmitted from the transmission/reception point. In LTE for example, a Physical Cell Identity PCI may be obtained by reading a signal referred to as the Primary Synchronization Signal PSS or the Secondary Synchronization Signal SSS. Techniques have been devised for detection of PSS and SSS although this is not necessary to describe herein as such.

In a further action 202, the wireless device measures a radio signal of the coverage object where the measured radio signal fulfils a predefined event condition. This could be performed by measuring a reference signal or the like which is transmitted from the transmission/reception point serving the coverage object, and by determining that at least one of a set of predefined event conditions is fulfilled by the measured signal, e.g. one of the event conditions defined for LTE which were referenced above. Basically, measuring a signal in this context may include measuring a received signal strength and/or signal quality, e.g. in the form of Signal to Interference and Noise, SINR, or similar parameters.

A following action 204 illustrates that the wireless device sends a measurement report of said measuring to a higher layer node in the wireless network operable according to one or more layers above layer 1 and layer 2, since the detected and identified coverage object is not in the first list. If the coverage object had been in that list, the wireless device would be required to send the measurement report to a lower layer node instead, thus not send it to the higher layer node. The measurement report in this action contains an identification of the detected coverage object and a measurement result such as an SINR value of the like. It is also possible that the wireless device could send a measurement report of said measuring to a lower layer node in addition to the higher layer node.

Figure 2:
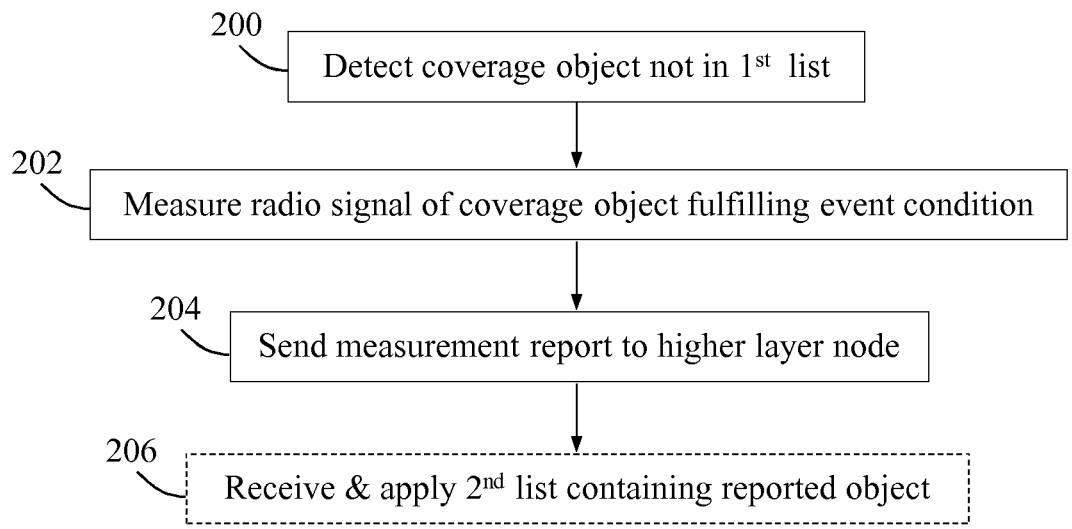
FIG. 2 is a flow chart illustrating a procedure in a wireless device, according to some possible embodiments.

Some potential advantages that may be accomplished by employing the above procedure in FIG. 2 are as follows:
- The wireless device is able to move within an area supported by relatively fast lower layer mobility based on Layer 2/Layer 1 signaling which has much lower latency than higher layer signaling.
- The wireless device only sends measurement reports to higher layers when the network needs to evaluate and use the reports on higher layers. The load on the higher layer node will thus be considerably reduced by getting fewer measurement reports to process, as compared to conventional procedures.
- The higher layers are in control, e.g. by configuring appropriate list of coverage objects, of when measurement reports are considered needed on higher layers and can decide network actions based on the reported measurements from the wireless device.
- If an unknown cell, which is not part of any list of coverage objects, is detected by the wireless device, it will send a measurement report to the higher layers and the network can start a cell identification process, e.g.

- to support automatic neighboring cell configuration update of a cell table or a data base.
- The network can get an early indication that other network nodes need to be prepared before actually taking them into service for the connection.
- By updating the list of coverage objects appropriately, the network can create Cell/beam overlap areas to provide hysteresis on cell/beam level to avoid excessive measurement reporting to higher layers due to a "ping-pong" behavior at cell/beam borders.
- The network can decide that for some target cells there is a need to change network nodes used at the same time as the wireless device changes cell by handover.

Some further embodiments and examples of how the above procedure in FIG. 2 may be realized, will now be outlined. In one example embodiment, the wireless device may be required to apply the first list for measurement reporting to the lower layer node when being in a connected state. Thereby, the lower layer node will be enabled to handle mobility for the wireless device such as making handover decisions, on the basis of such measurement reports for the coverage objects in the list, which reports will contain measurement results that have not yet become out-of-date and irrelevant.

In another example embodiment, the first list may have been configured for a specific event condition or for a set of multiple event conditions. It is thus not necessary to apply the list-based measurement reporting for all prevailing event conditions, e.g. the ones listed in the Background, and any subset of the available event conditions may be applied in the procedures described herein. Hence, the first list may be configured per event condition, or for any subset of event conditions, or for all the defined event conditions.

In another example embodiment, the wireless device may further receive from the higher layer node, a predefined second list of coverage objects containing the detected coverage object, and apply the second list for measurement reporting to a lower layer node. This embodiment is illustrated by an optional action 206 in FIG. 2. Thereby, the higher layer node is able to control how the wireless device should report its measurements to a lower layer node. In this case, another example embodiment may be that the second list further contains a cell or beam currently serving the wireless device 400. A further example embodiment may be that the first and second lists could be overlapping by both containing at least said serving cell or beam. In other words, the cell or beam currently serving the wireless device is in this case present in both the first list and the second list.

In further example embodiments, the higher layer node may be a Radio Access Network Controlling node, and the measurement report may be an RRC measurement report. In further example embodiments, the higher layer node may be a combination of a core network node and a Radio Access Network Controlling node, or a central unit as defined by 3GPP for Next Generation, NG, radio networks, see e.g. FIG. 1. As mentioned above, the lower layer nodes described herein may be distributed units, as defined for NG radio networks. In another example embodiment, the predefined event condition that is fulfilled in the above procedure may be one of a set of event conditions defined for Long Term Evolution, LTE.

An example will now be described, with reference to the flow chart in FIG. 3, of how the solution may be employed in terms of actions which could be performed by a higher layer node of a wireless network. Some optional example embodiments that could be used in this procedure will also be described below. This procedure may be employed in a higher layer node which may be a central unit, as mentioned above, and any suitable protocols and standards for communication may be employed in this procedure.

The higher layer node in this procedure is arranged to handle measurement reporting by a wireless device, and the higher layer node is operable according to one or more layers above layer 1 and layer 2. A first action 300 illustrates that the higher layer node receives from the wireless device a measurement report for a measured radio signal of a coverage object. The measurement report indicates that the measured radio signal fulfils a predefined event condition, and the coverage object is a cell or a beam not contained in a predefined first list of coverage objects for which the wireless device is required to send measurement reports to a lower layer node in the wireless network operable according to at least one of layer 1 and layer 2. This action corresponds to action 204 in FIG. 2.

In another action 302, the higher layer node obtains a second list of coverage objects containing the reported coverage object. The first and second lists may have been preconfigured to include cells and/or beams of specific predefined areas which may be wholly separate from one another or partly overlapping.

In a next action 304, the higher layer node sends the second list to the wireless device as an instruction to apply the second list for measurement reporting to the lower layer node, which corresponds to action 206 in FIG. 2. Thereby, the higher layer node is able to control the wireless device's measurement reporting by selecting or creating a suitable list of coverage objects and sending it to the device.

Figure 3:
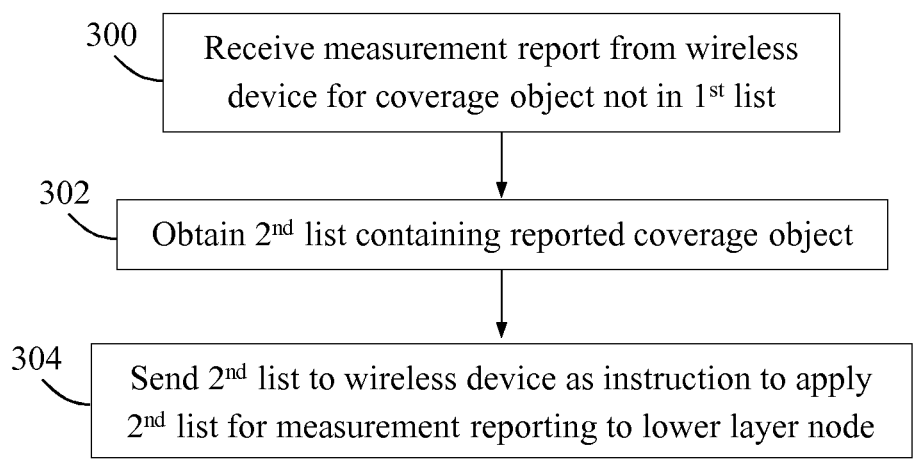
FIG. 3 is a flow chart illustrating a procedure in a higher layer node, according to further possible embodiments.

Some further embodiments and examples of how the above procedure in FIG. 3 may be realized, will now be outlined. The following embodiments were mentioned above for the procedure in FIG. 2 which are thus applicable also for the procedure in FIG. 3. In one example embodiment, at least one of said first and second lists may be configured for a specific event condition or for a set of multiple event conditions. It was described above how the first list may be configured for different event conditions and this is thus also applicable for the second list.

It was mentioned above that the second list contains the reported coverage object. In another example embodiment, the second list may further contain a cell or beam currently serving the wireless device. In this case, another example embodiment may be that the first and second lists are overlapping by both containing said serving cell or beam.

In further example embodiments, the higher layer node may be a Radio Resource Control, RRC, layer node and the measurement report may be an RRC measurement report. In further example embodiments, the higher layer node may be a combination of a core network node and a Radio Access Network Controlling node, or a central unit as defined by 3GPP for NG radio networks. In another example embodiment, the predefined event condition is one of a set of event conditions defined for Long Term Evolution, LTE.

Figure 4:
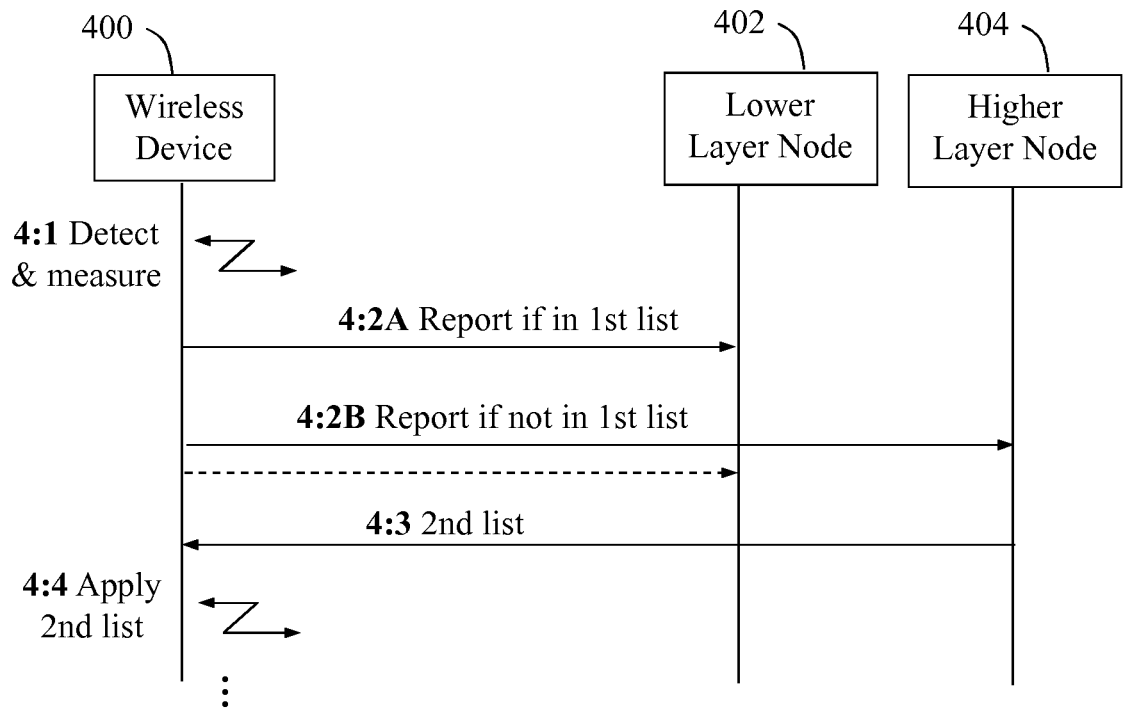
FIG. 4 is an example signalling diagram involving a wireless device, a lower layer node, and a higher layer node.

Another example of how the solution may be employed will now be described with reference to the signalling diagram in FIG. 4 involving a wireless device 400, a lower layer node 402 and a higher layer node 404. The wireless device 400 is basically operable to perform the procedure in FIG. 2, while the higher layer node 404 is basically operable to perform the procedure in FIG. 3. It is assumed that the wireless device 400 is required to report to the lower layer node 402 measurements of radio signals of coverage objects that are included in a first list configured in the wireless device 400.

A first action 4:1 illustrates that the wireless device 400 detects and identifies a coverage object, and also measures a radio signal transmitted from a Tx/Rx point serving the coverage object, e.g. a cell or a beam. It has been described above how such a signal measurement may be performed. The next action depends on whether the detected and identified coverage object is in the first list or not.

If the wireless device 400 finds that the coverage object is in the first list, a report of the measurement is sent to the lower layer node 402 in an action 4:2A. On the other hand, if the wireless device 400 finds that the coverage object is not in the first list, a report of the measurement is sent to the higher layer node 404 in an alternative action 4:2B. A dashed arrow indicates that in the latter case, the wireless device 400 may in action 4:2B send a measurement report also to the lower layer node 402 as well as to the higher layer node 404.

In the case of having received the measurement report in alternative 4:2B, a further action 4:3 illustrates that the higher layer node 404 sends a second list of coverage objects to the wireless device 400, as an instruction to apply the second list, instead of the first list, for measurement reporting to a lower layer node, which corresponds to action 304. A final action 4:4 illustrates that the wireless device 400 accordingly applies the received second list for measurement reporting, which corresponds to action 206.

Figure 5A:
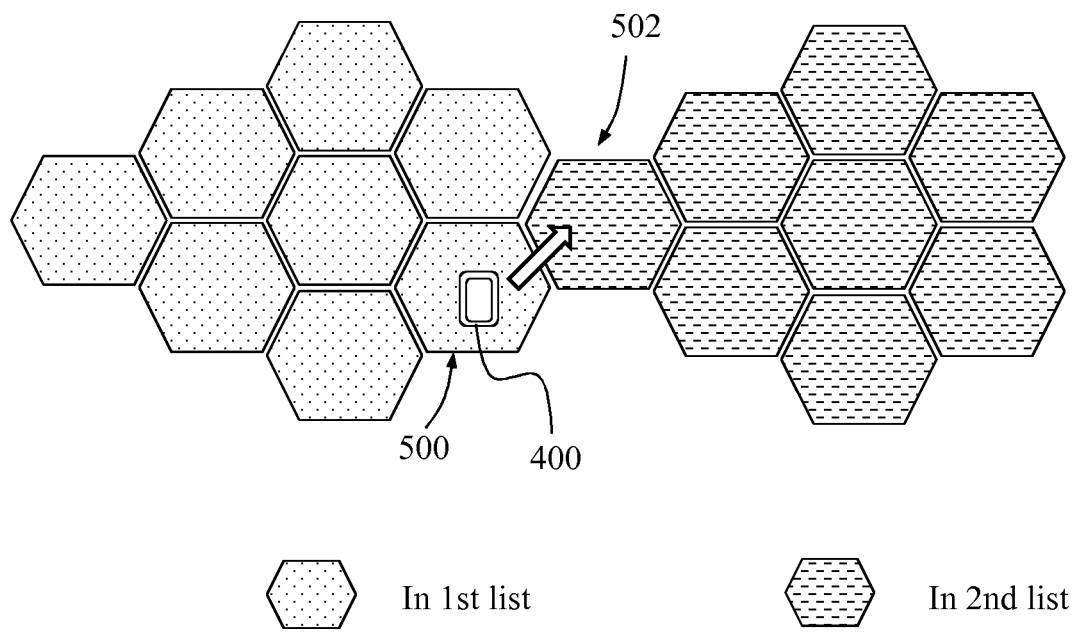
FIGS. 5A-C illustrate three example scenarios with coverage objects where the solution could be used, according to further possible embodiments.

Some examples of network scenarios where the solution may be employed by the wireless device 400, will now be described with reference to FIGS. 5A-C. In FIG. 5A, the wireless device 400 is served by a cell 500 and is configured with a first list of coverage objects, schematically indicated as a dotted area, for measurement reporting to a lower layer node 402. The wireless device 400 detects and identifies a cell 502 which is not in the first list, and accordingly sends a measurement report for cell 502 to the higher layer node 404. The wireless device 400 receives from the higher layer node 404 a second list of coverage objects, schematically indicated as a dashed area, for measurement reporting to a lower layer node. It can be seen that the second list contains the cell 502 reported by the wireless device 400. In this example, the first and second lists are wholly separated with no overlap.

Figure 5B:
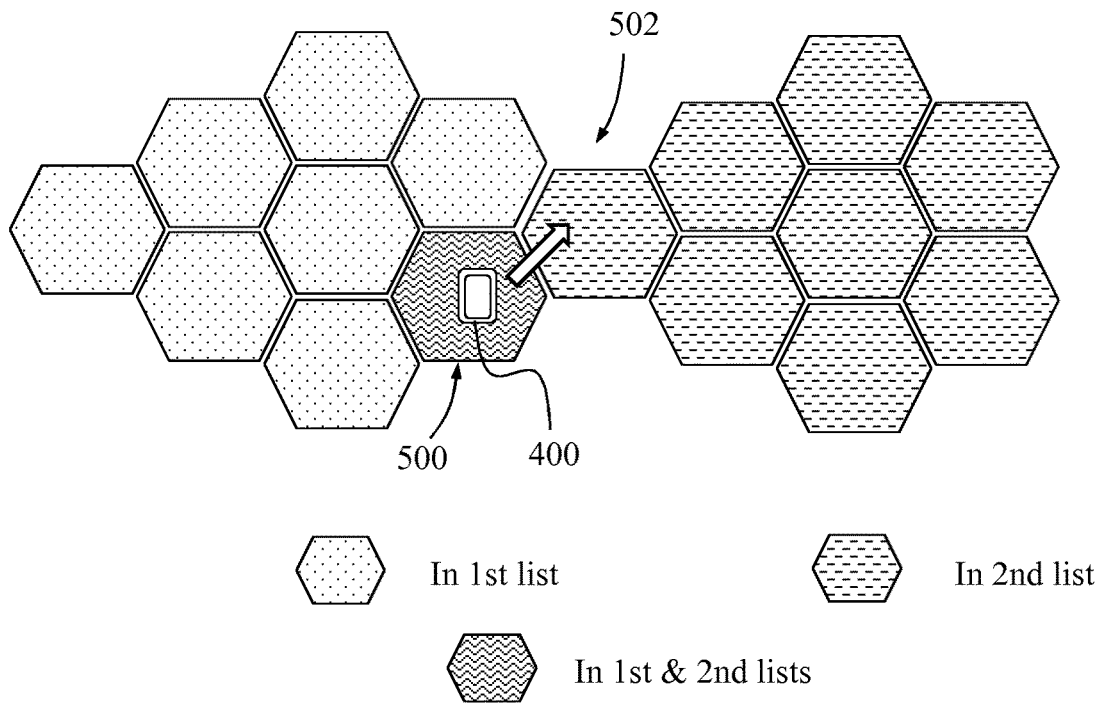

In FIG. 5B, the wireless device 400 is likewise served by a cell 500 and is initially configured with the first list as in the previous example. When detecting and identifying cell 502 which is not in the first list, the wireless device 400 again sends a measurement report for cell 502 to the higher layer node 404. The wireless device 400 receives from the higher layer node 404 a second list of coverage objects, for measurement reporting to a lower layer node. It can be seen in this example that both the first and second lists contain the cell 502 currently serving the wireless device 400, and the first and second lists are thus overlapping.

Figure 5C:
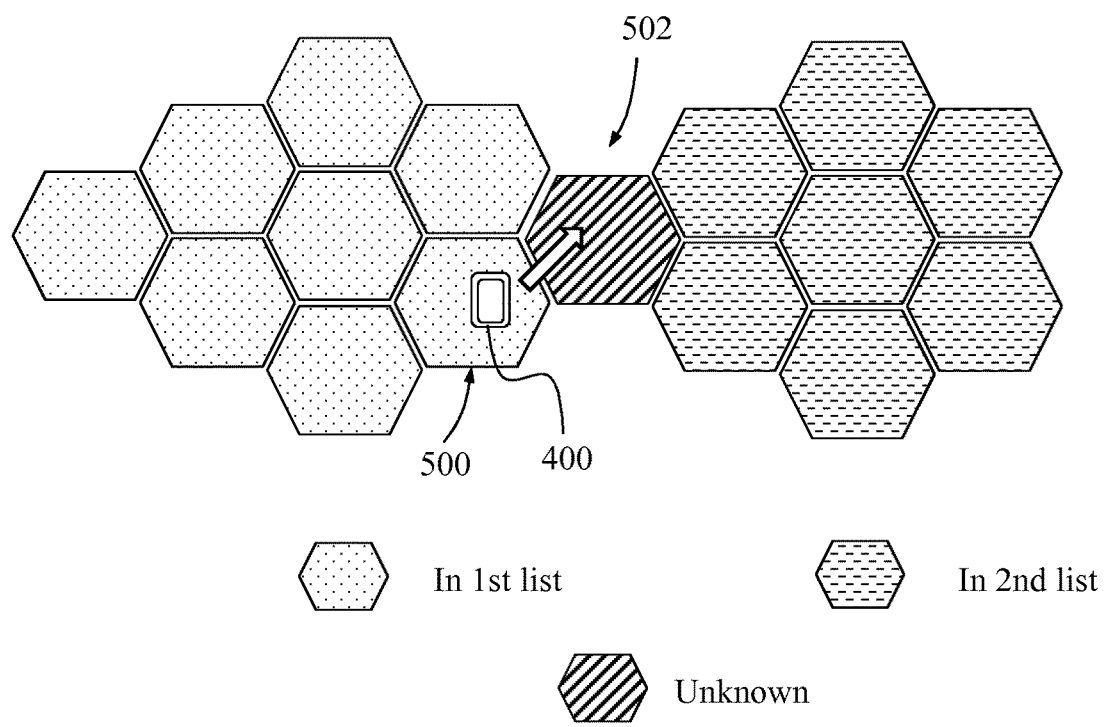

In FIG. 5C, the wireless device 400 is likewise served by a cell 500 and is initially configured with the first list as in the previous examples. When detecting and identifying cell 502 which is not in the first list, the wireless device 400 again sends a measurement report for cell 502 to the higher layer node 404. In this example, the cell 502 is unknown and is thus not present in either of the first and second lists. This measurement report enables the higher layer node 404 to initiate a procedure for identifying the unknown cell 502, and once it has been identified the higher layer node 404 may update the second list by adding cell 502 thereto which will thereby become a dashed cell. It is also possible that the higher layer node 404 may also update the first list by adding cell 502 thereto which will thereby become both dashed and dotted.

Figure 6:
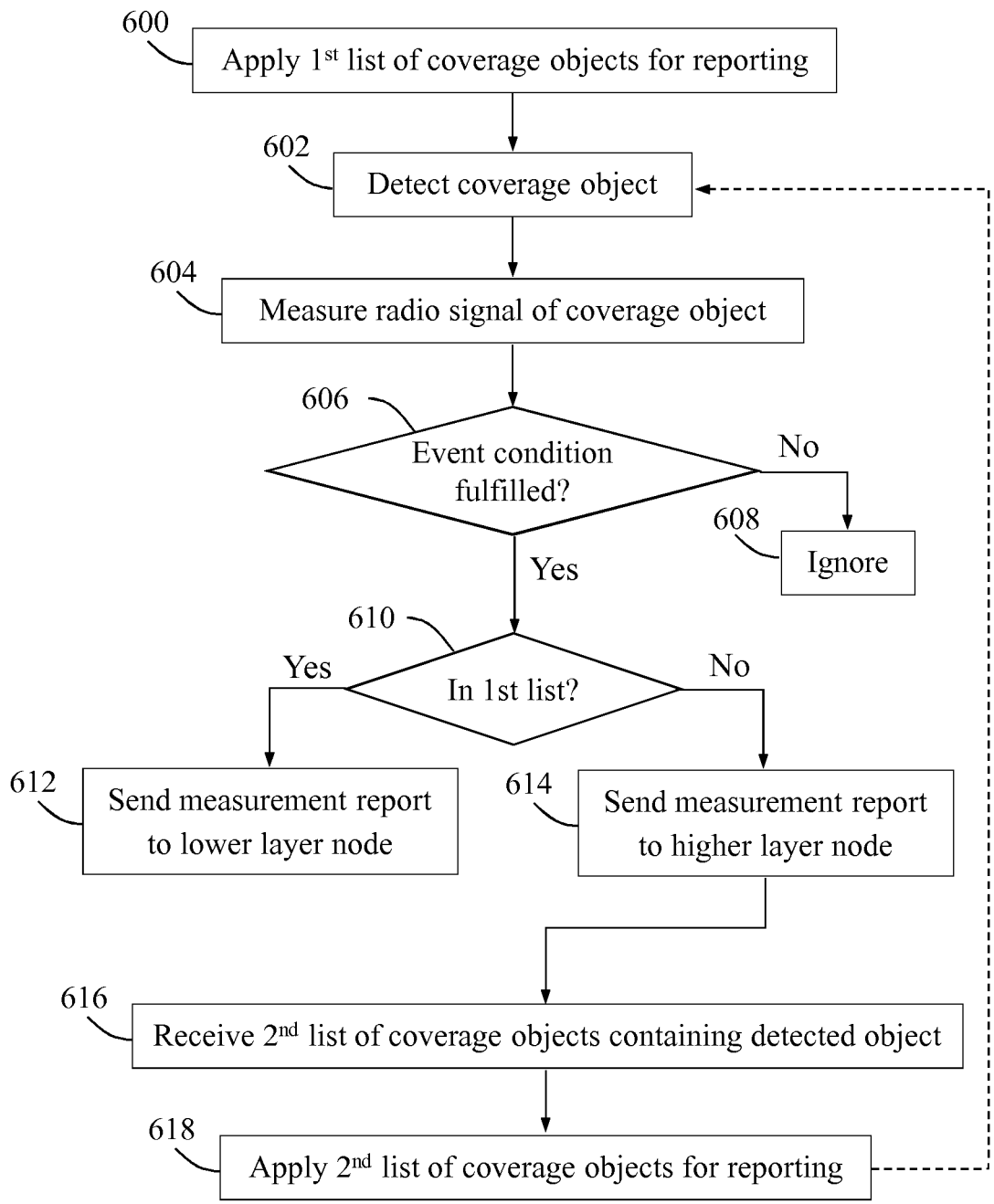
FIG. 6 is a flow chart illustrating a more detailed example procedure in a wireless device, according to further possible embodiments.

A more detailed but non-limiting example of how the above-described wireless device may operate when the solution is employed, will now be described with reference to the flow chart in FIG. 6. A first action 600 illustrates that the wireless device applies a first list of coverage objects for measurement reporting, basically in the manner described above. In a next shown action 602, the wireless device detects and identifies a coverage object, and then measures a radio signal transmitted from the coverage object, in an action 604.

The wireless device further checks in an action 606 whether any event condition is fulfilled by the measured radio signal. If not, the measurement may be ignored in an action 608 and no measurement report is sent to either of the lower and higher layer nodes. If at least one event condition is fulfilled by the measured radio signal, the wireless device proceeds to check in an action 610 whether the detected coverage object is in the first list or not. If so, the wireless device sends a measurement report to the lower layer node in an action 612. On the other hand, if the detected coverage object is not in the first list, the wireless device sends a measurement report to the higher layer node in an action 614, and optionally also to the lower layer node, not shown.

After action 614, the wireless device receives a second list of coverage objects from the higher layer node in an action 616. The wireless device then accordingly applies the second list for measurement reporting, in a final action 618, which may involve repeating the procedure from action 602, as indicated by a dashed arrow, but with the second list replacing the first list. This way, the wireless device can perform frequent signaling of measurement reports at the lower layer in support for mobility and possibly also to support detection of interference and activities in the network, without causing added load on the higher layers.

Figure 1A:
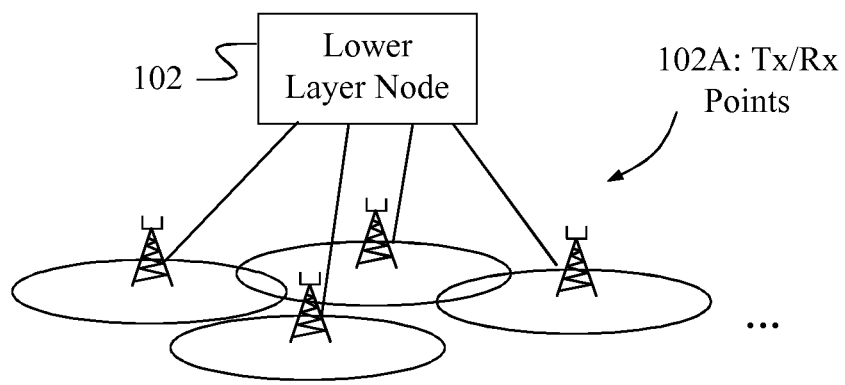
FIG. 1A is a communication scenario illustrating how a lower layer node may be arranged in more detail, according to the prior art.
Figure 7:
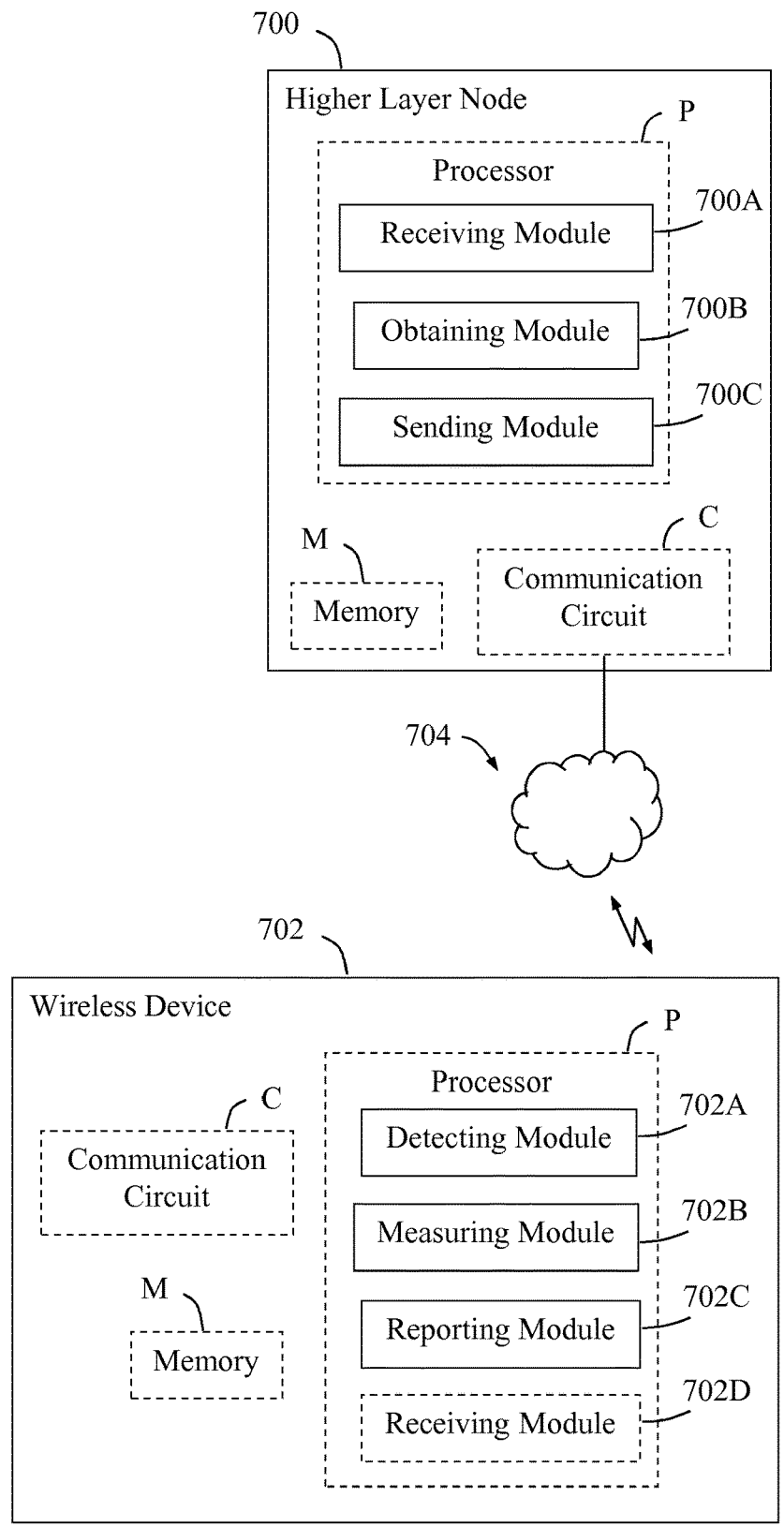
FIG. 7 is a block diagram illustrating a wireless device and a higher layer node in more detail, according to further possible embodiments.

The block diagram in FIG. 7 illustrates a detailed but non-limiting example of how a higher layer node 700 and a wireless device 702, respectively, may be structured to bring about the above-described solution and embodiments thereof. In this figure, the higher layer node 700 and the wireless device 702 may be configured to operate according to any of the examples and embodiments of employing the solution as described herein, where appropriate. Each of the higher layer node 700 and the wireless device 702 is shown to comprise a processor "P", a memory "M" and a communication circuit "C" with suitable equipment for transmitting and receiving messages in the manner described herein. The wireless device 702 communicates with the higher layer node 700 over a schematically shown radio network 704 which includes a plurality of lower layer nodes such as base stations, as described above with reference to the scenarios in FIGS. 1 and 1A.

The communication circuit C in each of the higher layer node 700 and the wireless device 702 thus comprises equipment configured for communication with each other using a suitable protocol for the communication depending on the implementation and the layer used. The solution is however not limited to any specific types of signals or protocols.

The wireless device 702 is, e.g. by means of units, modules or the like, configured or arranged to perform at least some of the actions of the flow charts in FIGS. 2 and 6 and as follows. Further, the higher layer node 700 is, e.g. by means of units, modules or the like, configured or arranged to perform at least some of the actions of the flow chart in FIG. 3 and as follows.

The wireless device 702 is arranged to handle measurement reporting in a wireless network. The wireless device 702 is configured to detect and identify a coverage object being a cell or a beam not contained in a predefined first list of coverage objects for which the wireless device 702 is required to send measurement reports to a lower layer node in the wireless network operable according to at least one of layer 1 and layer 2. This operation may be performed by a detecting module 702A in the wireless device 702 as also illustrated in action 200 and possibly action 602. The detecting module 702A could alternatively be named an identifying module or discovering module.

The wireless device 702 is further configured to measure a radio signal of the coverage object where the measured radio signal fulfils a predefined event condition. This operation may be performed by a measuring module 702B in the wireless device 702, as also illustrated in action 202 and possibly action 604. The wireless device 702 is further configured to send a measurement report of said measuring to a higher layer node 700 in the wireless network operable according to one or more layers above layer 1 and layer 2. This operation may be performed by a reporting module 702C in the wireless device 702, as also illustrated in actions 408 and 614. The reporting module 702C could alternatively be named a sending module.

The wireless device 702 may be further configured to receive from said higher layer node 700, a predefined second list of coverage objects containing the detected coverage object, which may be performed by a receiving module 702D in the wireless device 702, e.g. as described above for actions 206 and 616. In that case, the wireless device 702 may be further configured to apply the second list for measurement reporting to a lower layer node, e.g. as described above for actions 206 and 618, which may be performed by using the measuring module 702B and the reporting module 702C in the manner described above.

The higher layer node 700 is arranged to handle measurement reporting by a wireless device 702 in a wireless network, the higher layer node 700 being operable according to one or more layers above layer 1 and layer 2.

The higher layer node 700 is configured to receive from the wireless device 702 a measurement report for a measured radio signal of a coverage object, the measurement report indicating that the measured radio signal fulfils a predefined event condition. The coverage object is a cell or a beam not contained in a predefined first list of coverage objects for which the wireless device 702 is required to send measurement reports to a lower layer node in the wireless network operable according to at least one of layer 1 and layer 2. This operation may be performed by a receiving module 700A in the higher layer node 700, as also illustrated in action 300.

The higher layer node 700 is also configured to obtain a second list of coverage objects containing the reported coverage object. This operation may be performed by an obtaining module 700B in the higher layer node 700, as also illustrated in action 302. The obtaining module 700B could alternatively be named a logic module or list module. The higher layer node 700 is further configured to send the second list to the wireless device 702 as an instruction to apply the second list for measurement reporting to the lower layer node. This operation may be performed by a sending module 700C in the higher layer node 700 as also illustrated in action 304. The sending module 700C could alternatively be named an instructing module or configuring module.

It should be noted that FIG. 7 illustrates various functional modules in the higher layer node 700 and the wireless device 702, respectively, and the skilled person is able to implement these functional modules in practice using suitable software and hardware equipment. Thus, the solution is generally not limited to the shown structures of the higher layer node 700 and the wireless device 702, and the functional modules therein may be configured to operate according to any of the features, examples and embodiments described in this disclosure, where appropriate.

The functional modules 700A-C and 702A-D described above may be implemented in the higher layer node 700 and the wireless device 702, respectively, by means of program modules of a respective computer program comprising code means which, when run by the processor P causes the higher layer node 700 and the wireless device 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the higher layer node 700 and the wireless device 702 in the form of a memory having a computer readable medium and being connected to the processor P. The computer program product or memory M in each of the higher layer node 700 and the wireless device 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective higher layer node 700 and wireless device 702.

The solution described herein may be implemented in each of the higher layer node 700 and the wireless device 702 by a computer program comprising instructions which, when executed on at least one processor, cause the at least one processor to carry out the actions according to any of the above embodiments and examples, where appropriate. The solution may also be implemented at each of the higher layer node 700 and the wireless device 702 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "wireless device", "higher layer node", "lower layer node", "coverage object", "event condition", "list" and "measurement report" have been used throughout this disclosure, although any other corresponding entities, functions, and/or parameters could also be used having the features and characteristics described here. The solution is defined by the appended claims.

The invention claimed is:

1. A method performed by a wireless device in a connected state, for handling measurement reporting in a wireless network, the method comprising:

detecting a coverage object, the coverage object being a cell or a beam of the wireless network;
measuring a radio signal of the coverage object, to obtain a signal measurement; and
sending a measurement report responsive to the signal measurement fulfilling a predefined event condition, wherein the sending comprises:
 determining that the predefined event condition is an event condition to which a first list of coverage objects applies and, responsive to the detected coverage object belonging to the first list, sending the measurement report only to a lower layer node in the wireless network; or
 responsive either to determining that the first list does not apply to the predefined event condition or that the detected coverage object does not belong to the first list, sending the measurement report at least to a higher layer node in the wireless network;
wherein the lower layer node is operable according to at least one of layer 1 and layer 2, and the higher layer node is operable according to one or more layers above layer 1 and layer 2.

2. The method according to claim 1, wherein the lower layer node provides serving radio coverage for the wireless device and wherein the higher layer node controls one or more lower-layer nodes, including the lower layer node.

3. The method according to claim 1, wherein the predefined event condition is one among a plurality of predefined event conditions that trigger measurement reporting by the wireless device, and wherein the first list applies to fewer than all predefined event conditions in the plurality of predefined event conditions.

4. The method according to claim 1, wherein the detected coverage object does not belong to the first list and the sending comprises sending the measurement report to the higher layer node, and wherein the method further comprises:
 receiving from said higher layer node, a second list of coverage objects containing the detected coverage object; and
 applying the second list for measurement reporting to the same or another lower layer node, such that a subsequent fulfillment by the detected coverage object of the predefined event condition or another predefined event condition to which the second list applies, triggers the wireless device to send a subsequent measurement report for the detected coverage object only to same or other lower layer node.

5. The method according to claim 4, wherein a serving cell or beam of the wireless device belongs to the first list, and wherein the second list overlaps with the first list by containing the serving cell or beam.

6. The method according to claim 1, wherein said higher layer node is a Radio Resource Control (RRC) layer node and the measurement report is an RRC measurement report.

7. The method according to claim 1, wherein the higher layer node is a combination of a core network node and a Radio Access Network Controlling node, or a central unit.

8. The method according to claim 1, wherein said predefined event condition is one of a set of event conditions defined for Long Term Evolution (LTE).

9. A wireless device arranged to handle measurement reporting in a wireless network with respect to the wireless device being in a connected state, wherein the wireless device is configured to:
 detect a coverage object, the detected coverage object being a cell or a beam of the wireless network;
 measure a radio signal of the coverage object, to obtain a signal measurement; and
 send a measurement report responsive to the signal measurement fulfilling a predefined event condition, based on the wireless device being configured to:
  responsive to determining that the predefined event condition is an event condition to which a first list applies and further determining that the detected coverage object belongs to the first list, send the measurement report only to a lower layer node in the wireless network; or
  responsive either to determining that the first list does not apply to the predefined event condition or that the detected coverage object does not belong to the first list, send the measurement report at least to a higher layer node in the wireless network;
 wherein the lower layer node is operable according to at least one of layer 1 and layer 2, and the higher layer node is operable according to one or more layers above layer 1 and layer 2.

10. The wireless device according to claim 9, wherein the lower layer node provides serving radio coverage for the wireless device and wherein the higher layer node controls one or more lower layer nodes, including the lower layer node.

11. The wireless device according to claim 9, wherein the predefined event condition is one among a plurality of predefined event conditions that trigger measurement reporting by the wireless device, and wherein the first list applies to fewer than all predefined event conditions in the plurality of predefined event conditions.

12. The wireless device according to claim 9, wherein the detected coverage object does not belong to the first list and the sending comprises sending the measurement report to the higher layer node, and wherein the wireless device is further configured to:
 receive from said higher layer node, a second list of coverage objects containing the detected coverage object; and
 apply the second list for measurement reporting to the same or another lower layer node, such that a subsequent fulfillment by the detected coverage object of the predefined event condition or another predefined event condition to which the second list applies, triggers the wireless device to send a subsequent measurement report for the detected coverage object only to the same or other lower layer node.

13. The wireless device according to claim 12, wherein a serving cell or beam of the wireless device belongs to the first list, and wherein the second list overlaps with the first list by containing the serving cell or beam.

14. The wireless device according to claim 9, wherein said higher layer node is a Radio Resource Control (RRC) layer node and the measurement report is an RRC measurement report.

15. The wireless device according to claim 9, wherein said predefined event condition is one of a set of event conditions defined for Long Term Evolution (LTE).

16. A method performed by a higher layer node of a wireless network for handling measurement reporting by a wireless device in a connected state, the higher layer node being operable according to one or more layers above layer 1 and layer 2, the method comprising:
 receiving from the wireless device a measurement report for a measured radio signal of a coverage object, the measurement report indicating that the measured radio signal fulfils a predefined event condition, the coverage object being a cell or a beam not contained in a first list of coverage objects for which the wireless device is required to send measurement reports only to a lower layer node in the wireless network operable according to at least one of layer 1 and layer 2;

determining that the wireless device should use lower-layer reporting to the lower layer node for the coverage object, instead of higher-layer reporting to the higher layer node; and sending a second list of coverage objects to the wireless device, the second list listing at least the coverage object and serving as an instruction to the wireless device to apply the second list for measurement reporting to the lower layer node.

17. The method according to claim 16, wherein there is a plurality of predefined event conditions that trigger measurement reporting by the wireless device with respect to coverage objects detected by the wireless device, and wherein the method further comprises, for one or both the first and second lists, configuring which ones among the plurality of predefined event conditions are applicable.

18. The method according to claim 16, wherein the first list and the second list contain a serving cell or beam of the wireless device.

19. The method according to claim 16, wherein the higher layer node is a Radio Resource Control (RRC) layer node and the measurement report is an RRC measurement report.

20. The method according to claim 16, wherein the higher layer node is a combination of a core network node and a Radio Access Network Controlling node, or a central unit.

21. The method according to claim 16, wherein said predefined event condition is one of a set of event conditions defined for Long Term Evolution (LTE).

22. A higher layer node of a wireless network, the higher layer node arranged to handle measurement reporting by a wireless device in a connected state and being operable according to one or more layers above layer 1 and layer 2, wherein the higher layer node is configured to:

receive from the wireless device a measurement report for a measured radio signal of a coverage object, the measurement report indicating that the measured radio signal fulfils a predefined event condition, the coverage object being a cell or a beam not contained in a first list of coverage objects for which the wireless device is required to send measurement reports only to a lower layer node in the wireless network operable according to at least one of layer 1 and layer 2;

determine that the wireless device should use lower-layer reporting to the lower layer node for the coverage object, instead of higher-layer reporting to the higher layer node; and send a second list of coverage objects to the wireless device, the second list listing at least the coverage object and serving as an instruction to the wireless device to apply the second list for measurement reporting to the lower layer node.

23. The higher layer node according to claim 22, wherein there is a plurality of predefined event conditions that trigger measurement reporting by the wireless device with respect to coverage objects detected by the wireless device, and wherein the method further comprises, for one or both the first and second lists, configuring which ones among the plurality of predefined event conditions are applicable.

24. The higher layer node according to claim 22, wherein the first and second lists contain a serving cell or beam of the wireless device.

25. The higher layer node according to claim 22, wherein the higher layer node is a Radio Resource Control (RRC) layer node and the measurement report is an RRC measurement report.

26. The higher layer node according to claim 22, wherein the higher layer node is a combination of a core network node and a Radio Access Network Controlling node, or a central unit.

27. The higher layer node according to claim 22, wherein said predefined event condition is one of a set of event conditions defined for Long Term Evolution (LTE).

* * * * *